(12) United States Patent
Lesso et al.

(10) Patent No.: US 11,410,678 B2
(45) Date of Patent: Aug. 9, 2022

(54) METHODS AND APPARATUS FOR DETECTING SINGING

(71) Applicant: Cirrus Logic International Semiconductor Ltd., Edinburgh (GB)

(72) Inventors: John P. Lesso, Edinburgh (GB); Edward V. Sinnott, Edinburgh (GB); Andrew I. Bothwell, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/149,285

(22) Filed: Jan. 14, 2021

(65) Prior Publication Data
US 2022/0223168 A1    Jul. 14, 2022

(51) Int. Cl.
| | |
|---|---|
| G06F 3/16 | (2006.01) |
| G10L 25/51 | (2013.01) |
| G10K 11/178 | (2006.01) |
| G10L 25/30 | (2013.01) |
| G10L 25/06 | (2013.01) |
| G10L 25/21 | (2013.01) |
| H04R 1/08 | (2006.01) |

(52) U.S. Cl.
CPC .............. *G10L 25/51* (2013.01); *G06F 3/167* (2013.01); *G10K 11/17881* (2018.01); *G10K 11/17885* (2018.01); *G10L 25/06* (2013.01); *G10L 25/21* (2013.01); *G10L 25/30* (2013.01); *H04R 1/08* (2013.01); *G10K 2210/1081* (2013.01); *G10K 2210/3026* (2013.01); *G10K 2210/3027* (2013.01)

(58) Field of Classification Search
CPC .......... G10L 25/51; G10L 25/06; G10L 25/21
See application file for complete search history.

(56) References Cited

U.S. PATENT DOCUMENTS

| | | | |
|---|---|---|---|
| 9,367,613 B1 | 6/2016 | Tome | |
| 10,681,453 B1 | 6/2020 | Meiyappan et al. | |
| 2007/0162497 A1* | 7/2007 | Pauws | G06F 16/683 |
| 2015/0358720 A1* | 12/2015 | Campbell | H04R 1/1091 |
| | | | 381/151 |
| 2019/0042647 A1* | 2/2019 | Oh | G06F 16/637 |
| 2020/0396533 A1* | 12/2020 | Meiyappan | G10L 15/22 |

FOREIGN PATENT DOCUMENTS

JP    2008263383 A    10/2008

OTHER PUBLICATIONS

International Search Report and Written Opinion of the International Searching Authority, International Application No. PCT/GB2021/053090, dated Feb. 16, 2022.

* cited by examiner

*Primary Examiner* — Ping Lee
(74) *Attorney, Agent, or Firm* — Jackson Walker L.L.P.

(57) ABSTRACT

A method of detecting singing of a user of a personal audio device, the method comprising: receiving a first audio signal comprising bone-conducted speech of the user from a first transducer of the personal audio device; monitoring a second audio signal output to a speaker of the personal audio device; and determining whether the user is singing based on the first audio signal and the second audio signal.

23 Claims, 4 Drawing Sheets

| Metric | Normal Speech | Signing Speech |
|---|---|---|
| Correlation of envelope between SPB and SBC | low | high |
| Correlation of extracted pitch of SPB and SBC | low | high |
| Peak modulation frequency of SBC | 4-10Hz | Sub 4Hz |
| Harmonic coefficients of SBC | low | High |

METHODS AND APPARATUS FOR DETECTING SINGING

TECHNICAL FIELD

The present disclosure relates to methods and apparatus for determining whether a user of a personal audio device is singing.

BACKGROUND

Personal audio devices such as headsets are used to deliver sound to one or both ears of a user, such as music or audio files or telephony signals. Modern headsets typically also comprise one or more microphones which capture sound from the surrounding environment, such as the user's voice for voice recording or telephony, or background noise signals to be used to enhance signal processing by the device and user experience.

Some of these features are adapted based on the user's voice. For example, during audio playback to a speaker of the headset, when the user is speaking, active processing may be adapted and the volume level of audio playback may be reduced. Such adaptation may facilitate conversation if the user is speaking to a third party. However, when a user is singing along to audio playback, such adaptation may be detrimental to user experience.

SUMMARY

According to a first aspect of the disclosure, there is provided a method of detecting singing of a user of a personal audio device, the method comprising: receiving a first audio signal comprising bone-conducted speech of the user from a first transducer of the personal audio device; monitoring a second audio signal output to a speaker of the personal audio device; and determining whether the user is singing based on the first audio signal and the second audio signal.

The method may further comprise adapting an operation of the personal audio device or a host device coupled to the personal audio device on detecting that the user is singing.

The operation may comprise active noise cancellation, ANC.

Adapting the operation may comprise one or more of: adapting feedforward ANC; and adapting feedback ANC. Adapting feedforward ANC comprises turning feedforward ANC off. Alternatively, adapting feedforward ANC may comprise modifying a frequency range of operation of feedforward ANC. Adapting feedback ANC may comprise turning feedback ANC on or modifying a frequency range of operation of feedback ANC. For example, feedback ANC may be turned on at low frequencies whilst being switched off at higher frequencies.

In some embodiments, the operation may comprise pass-through of audio incident at the personal audio device to the speaker of the personal audio device.

Additionally or alternatively, the operation may comprise hearing augmentation.

Additionally or alternatively, the adapting the operation comprise disabling or enabling a voice assistant.

The method may further comprise determining whether the user is singing comprises: determining a likelihood that the user is singing.

In some embodiments, determining whether the user is not singing may further comprises: determining a likelihood that the user is singing.

In some embodiments, determining whether the user is singing may further comprise: determining a likelihood that the user is not singing; and determining whether the user is singing based on the likelihood that the user is singing and the likelihood that the user is not singing. Determining whether the user is singing may comprise providing the likelihood that the user is singing and the likelihood that the user is not singing to a neural network.

Detecting that the user is singing may comprise: determining a speech articulation rate of speech in the first audio signal; and comparing the speech articulation rate with an expected articulation rate of the user.

Detecting that the user is singing may comprise determining a peak modulation frequency of the first audio signal.

Detecting that the user is singing may comprise determining a correlation between the first audio signal and the second audio signal. This determination may comprise determining a correlation between an articulation rate of speech in the first audio signal and an articulation rate of speech in the second audio signal. Additionally or alternatively, determining the correlation may comprise determining a correlation one or more of: energy of the first and second audio signals; modulation frequency of the first and second audio signals; harmonic content of the first and second audio signals.

In some embodiments, the first transducer is a microphone. Alternatively, the first transducer may be an inertial measurement unit, such as a gyroscope or accelerometer.

According to another aspect of the disclosure, there is provided a non-transitory storage medium having instructions thereon which, when executed by a processor, cause the processor to perform the method described above.

According to another aspect of the disclosure, there is provided an apparatus for detecting singing by a user of a personal audio device, the apparatus comprising: an input for receiving a first audio signal comprising bone-conducted speech of the user from a first transducer of the personal audio device; one or more processors configured to: monitoring a second audio signal output to a speaker of the personal audio device; and determining whether the user is singing based on the first audio signal and the second audio signal.

According to another aspect of the disclosure, there is provided an electronic device comprising: the apparatus described above; the first transducer; and the speaker. The first transducer may be a microphone or an inertial measurement unit.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to the detection and characterisation of singing (which may include humming) of a user of a personal audio device worn by a user and comprising one or more sensors configured to pick up sound and/or vibrations associated with the user's speech.

Figure 1:
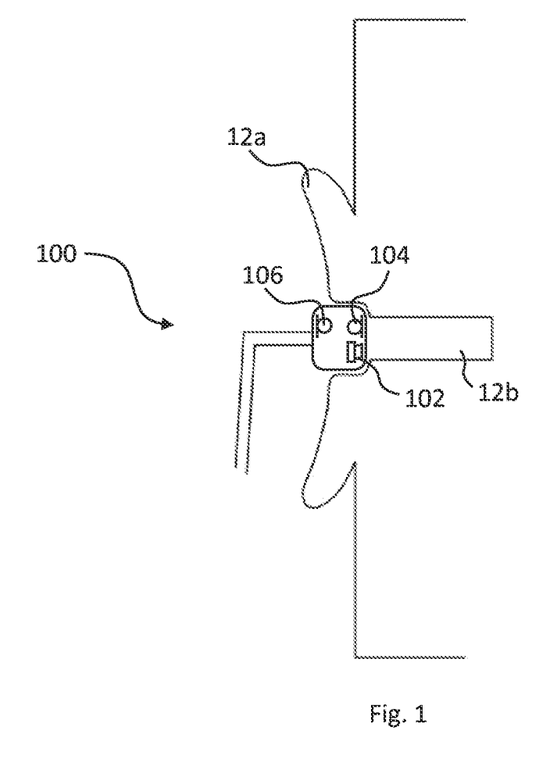
FIG. 1 is a schematic diagram of a user's ear and a personal audio device inserted into the user's ear.

FIG. 1 shows a schematic diagram of a user's ear, comprising the (external) pinna or auricle 12a, and the (internal) ear canal 12b. A personal audio device comprising an intra-concha headphone 100 (or earphone) sits inside the user's concha cavity. The intra-concha headphone may fit loosely within the cavity, allowing the flow of air into and out of the user's ear canal 12b which results in partial occlusion of the ear canal of the user. Alternatively, the headphone 100 may form a tight seal with the ear canal which may result in full occlusion.

The headphone 100 comprises one or more loudspeakers 102 positioned on an internal surface of the headphone 100 and arranged to generate acoustic signals towards the user's ear and particularly the ear canal 12b. The earphone further comprises one or more microphones (or other transducers such as accelerometers) 104, known as error microphone(s) or internal microphone(s), positioned on an internal surface of the earphone, arranged to detect acoustic signals within the internal volume defined by the headphone 100 and the ear canal 12b. The headphone 100 may also comprise one or more microphones 106, known as reference microphone(s) or external microphone(s), positioned on an external surface of the headphone 100 and configured to detect environmental noise incident at the user's ear.

The headphone 100 may be able to perform active noise cancellation (ANC), to reduce the amount of noise experienced by the user of the headphone 100. Active noise cancellation typically operates by detecting the noise (i.e. with a microphone) and generating a signal (i.e. with the loudspeaker) that has the same amplitude as the noise signal but is opposite in phase. The generated signal thus interferes destructively with the noise and so cancels or at least lessens the noise experienced by the user. Active noise cancellation may operate on the basis of feedback signals, feedforward signals, or a combination of both, i.e. a hybrid noise cancellation arrangement. Feedforward active noise cancellation utilizes the one or more microphones 106 on an external surface of the headphone 100, operative to detect the environmental noise before it reaches the user's ear. The detected noise is processed, and the cancellation signal generated so as to inversely match the incoming noise as it arrives at the user's ear thus cancelling, or at least reducing, the noise. Feedback active noise cancellation utilizes the one or more error microphones 104, also known as feedback microphones, positioned on the internal surface of the headphone 100, operative to detect the combination of the noise and the audio playback signal generated by the one or more loudspeakers 102. This combination is used in a feedback loop, together with knowledge of the audio playback signal, to adjust the cancelling signal generated by the loudspeaker 102 and so reduce or cancel the noise. The microphones 104, 106 shown in FIG. 1 may therefore form part of an active noise cancellation system, whether it be a feedforward, feedback or hybrid system implementing both feedforward and feedback ANC.

The headphone 100 may also operate in a passthrough or transparency mode in which sound incident at the microphone 106, positioned on an external surface of the headphone, is applied to the one or more loudspeakers 102 so that a user wearing the headset 100 is able to hear their ambient acoustic environment which has otherwise been occluded due to them wearing the headset 100 and therefore has ambient awareness.

In the embodiments described herein, where feedback and/or feedforward ANC or passthrough is implemented, the microphones 104, 106 may be used both for performing feedback and/or feedforward ANC and/or passthrough and for providing the singing detection functions as is described in detail below. In other embodiments, separate microphones may be provided for performing one or more of these functions. For example, the headphone 100 may comprise the internal microphone (or transducer) 104 for use in embodiments of the present disclosure (e.g. singing detection) and an additional microphone (not shown) may be used for one or more additional ANC/passthrough functions. In a further variation, the headphone 100 may utilise the speaker 102 for one or more of feedback/feedforward/hybrid ANC, passthrough, or singing detection. For example, the speaker 102 may be used as a sensor as is known in the art. The use of a speaker as a sensor is described in U.S. Pat. No. 10,506,336, the contents of which is hereby incorporated by reference in its entirety. Where the speaker 102 is used as a sensor, the internal microphone 104 may be omitted.

In embodiments described herein, the internal microphone 104 is used to detect sound in the ear canal which includes sound conducted through the user's head (bone conduction and tissue conduction). Embodiments of the present disclosure are not, however, limited to using microphones as transducers. For example, in some embodiments, the internal microphone 104 may be replaced with an accelerometer mechanically coupled to the user's head.

In the example shown in FIG. 1, an intra-concha headphone 100 is provided as an example personal audio device. It will be appreciated, however, that embodiments of the present disclosure can be implemented on any personal audio device which is configured to be placed at, in or near the ear of a user. Examples include circum-aural headphones worn over the ear, supra-aural headphones worn on the ear, in-ear headphones inserted partially or totally into the ear canal to form a tight seal with the ear canal, or mobile handsets held close to the user's ear so as to provide audio playback to the user's ear (e.g. during a telephone call). Embodiments of the present disclosure may be implemented in any type of headset that comprises at least one headphone operable to partially or fully occlude the ear. Examples include virtual reality headsets, augmented reality headsets and smart glasses to name a few.

Figure 2:
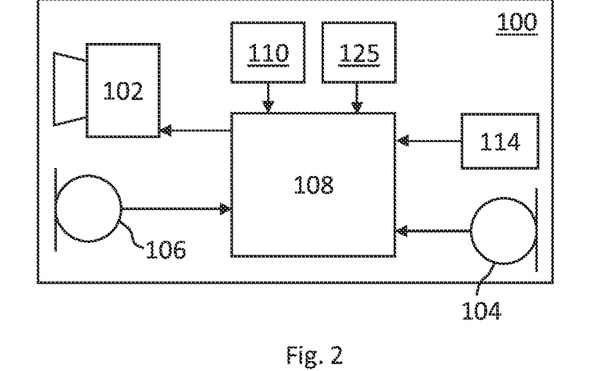
FIG. 2 is a schematic diagram of the personal audio device shown in FIG. 1.

FIG. 2 is a system schematic of the headphone 100. The headphone 100 may form part of a headset comprising another headphone (not shown) configured in substantially the same manner as the headphone 100. The pair of headphones (the headphone 100 and the other headphone which is not shown) may form a stereo headset.

A signal processor 108 of the headphone 100 is configured to receive microphone signals from the microphones 104, 106 and output audio signals to the loudspeaker 102. When the headphone 100 is positioned at, near or within the ear canal, the microphone 104 is occluded to some extent from the external ambient acoustic environment. The headphone 100 may be configured for a user to listen to music or audio, to make telephone calls, to deliver voice commands to a voice recognition system, and/or other such audio processing functions. The processor 108 may be configured to implement active noise cancellation (feedback and/or feedforward) and/or passthrough/transparency modes using the microphones 104, 106 and the one or more transducers 102.

The headphone 100 further comprises a memory 110, which may in practice be provided as a single component or as multiple components. The memory 110 is provided for storing data and/or program instructions. The headphone 100 further may further comprise a transceiver 112, which is provided for allowing the headphone 100 to communicate (wired or wirelessly) with external devices, such as another headphone, and/or a host device, such as a mobile device (e.g. smartphone) for example, to which the headphone 100 is coupled. Such communications between the headphone 100 and external device(s) may comprise wired communications where suitable wires are provided between left and right sides of a headset, either directly such as within an overhead band, or via an intermediate device such as a mobile device and/or wireless communications. The headphone may be powered by a battery and may comprise other sensors (not shown).

The headphone 100 may further comprise an inertial measurement unit (IMU) 114 sensor, such as an accelerometer or gyroscope, which may be configured to output inertial measurements to the processor 108. The IMU 114 may form part of the headphone 100. Alternatively, the IMU 114 may be a separate module in communication with the headphone 100, for example, via the transceiver 112. In some embodiments, for example where the headphone 100 is implemented as a headset worn on a user's head, the IMU 114 may be positioned away from the ear of the user when worn, for example on the nose bridge of a pair of smart glasses. The IMU 114 may be used to generate one or more signals representative of motion of the headphone 100 which may be used as a proxy for motion of the head of a user upon which the headphone 100 is being worn. Examples of motion include movement (forward, back, left, right, up, down) as well as tilt in any direction. A change in movement or tilt may also be derived from signals received from the IMU 114. Since coughing leads to motion of the head and body, the IMU 114 may be used to determine one or more characteristics of a cough based on characteristics of the detected motion at the IMU 114.

Embodiments of the present disclosure may utilise signals derived from the internal microphone 104, the speaker 102, the IMU 114 and/or the external microphone 106 to detect that a user or wearer of the headphone 100 is singing. Singing as described herein is the act of producing musical sounds with the voice. As such, singing may include voicing words and humming. Singing may differ from normal speech by the use of sustained tonality, rhythm, and a variety of vocal techniques.

Embodiments of the present disclosure may also utilise one of more of these signals to adapt the operation of the headphone 100. Adaptation of operation of the headphone 100 may comprise adapting the operation of ANC (feedforward and/or feedback), passthrough, voice assistance, etc.

Figure 3:
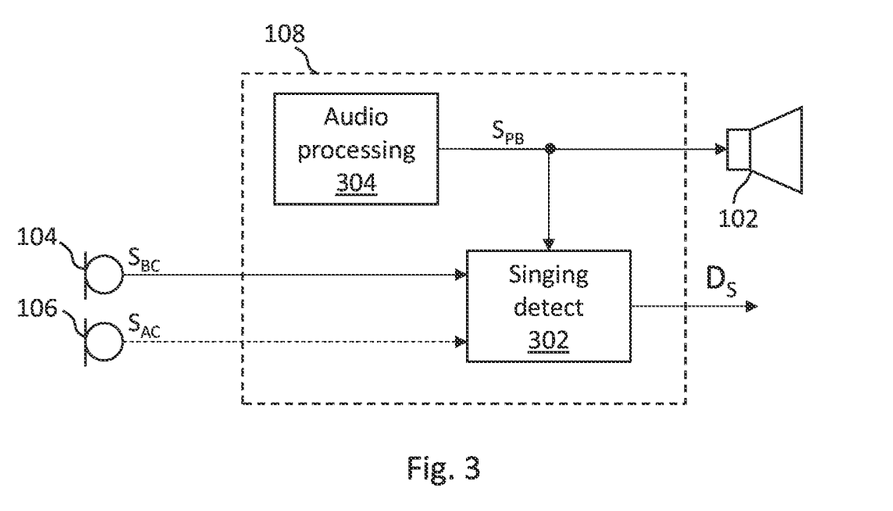
FIG. 3 is a block diagram of the processor shown in FIG. 2 implementing singing detection.

FIG. 3 is a block diagram showing the signal processor 108 according to some embodiments of the disclosure. For clarity, the memory 110 and transceiver 114 are not shown. The processor 108 may comprises a singing detect module 302. The processor 108 may comprise audio processing circuitry 304 configured to generate a playback audio signal to be played back through the speaker 102.

The singing detect module 302 may receive a first signal from an internal microphone 104 or IMU 114 and a second signal from the audio processing module 304 to be played back through the speaker. The singing detect module 302 may then output a singing indication $D_S$. The first signal received from the internal microphone 104 is referred to herein as $S_{BC}$. The second signal is referred to herein as $S_{PB}$ and is representative of playback audio which is also provided to the speaker 102. Optionally, the singing detect module 302 may also receive a third signal from the external microphone 106, referred to herein as SAC which will comprise air conducted speech of the user when the user is speaking, due to the conduction of speech from the user's mouth incident at the external microphone 106.

The first signal $S_{BC}$ is representative of the bone-conducted speech of the user when the user is speaking or singing, due to the conduction of speech through bones and tissue of the user's head. As such, when the user of the headphone 100 speaks or sings, the sound of the user's speech will be picked up in the first signal $S_{BC}$. Because the internal microphone 100 is partially isolated from external noise (which may include the voice of third parties), the first signal $S_{BC}$ can be used to distinguish between external noise (such as the voice of others) and speech of the user.

The singing detect module 302 may use at least the first and second signals $S_{BC}$, $S_{PB}$ to determine whether a user of the headphone 100 is singing. Embodiments of the present disclosure rely on the fact that if the user is wearing the headphone 100 and singing it is likely that the user is making sound which correlates at least partially with the music being played back at the speaker 102. By correlating or otherwise comparing the first signal $S_{BC}$ comprising speech of the user and the second signal $S_{PB}$ comprising playback audio, a determination can be made regarding the likelihood that the user is singing (or humming) along to the music or other sound being played back.

One or more metrics associated with the first and second signals $S_{BC}$, $S_{PB}$ may be used to determine whether the user is singing or not. These metrics may include a correlation between the envelope of the playback signal $S_{PB}$ and the first signal $S_{BC}$, correlation between a pitch of the playback signal $S_{PB}$ and the first signal $S_{BC}$, a determination of the peak modulation frequency of the first signal $S_{BC}$, characterisation of harmonic coefficients present in the first signal $S_{BC}$, characterisation of vocal effort of speech present in the first signal $S_{BC}$.

Figure 4:
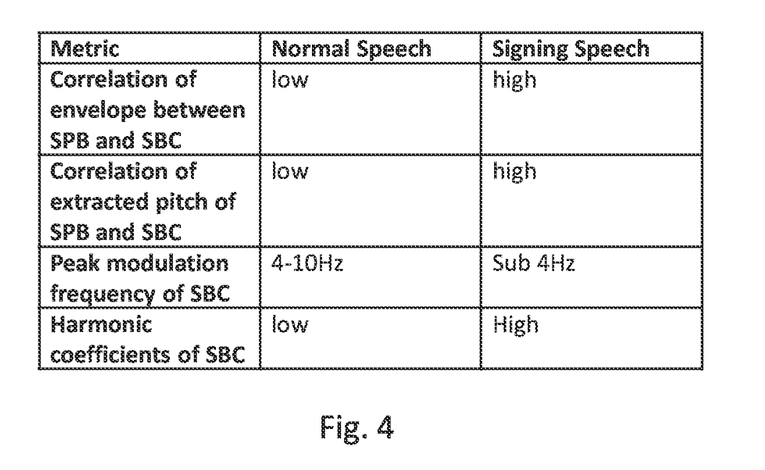
FIG. 4 is a table illustrating various metrics for determining singing of a user.

FIG. 4 is a table providing a comparative illustration of the various metrics listed above for both normal speech and singing speech. The relevance of each metric to distinguishing between normal and singing speech of the user will now be explained.

In some embodiments, the singing detect module 302 may determine a correlation between an envelope of the first signal $S_{BC}$ and an envelope of the second (playback) signal $S_{PB}$. A high correlation between the envelopes of the first and second signals $S_{BC}$, $S_{PB}$ suggests that the user's voice is synchronised with the sound being played back through the speaker 102 (singing). In contrast, a low correlation between the envelopes of the first and second signals $S_{BC}$, $S_{PB}$ suggests that the user's voice is not synchronised to the sound being played back through the speaker (i.e. non-singing or normal speech).

In some embodiments, the singing detect module 302 may determine a pitch of each of the first and second signal $S_{BC}$, $S_{PB}$ and subsequently determine a correlation between the pitch of the first signal $S_{BC}$ and the pitch of the second (playback) signal $S_{PB}$. A high correlation between the pitches of the first and second signals $S_{BC}$, $S_{PB}$ over time may suggest that the user is singing along to the sound being played back through the speaker 102, the pitch of the user's speech substantially mirroring that of the sound being played back through the speaker. In contrast, a low correlation between the pitches of the first and second signals $S_{BC}$, $S_{PB}$ may suggest that the user is not making any effort to match the speech or vocal sound to the pitch of the sound being played through the through the speaker (i.e. non-singing or normal speech).

In some embodiments, the singing detect module 302 may determine a modulation frequency (or articulation rate), such as a peak modulation frequency of the first signal $S_{BC}$. It will be appreciated that the sound of singing has a different peak modulation frequency to the sound of normal speech. For example, the sound of normal speech may have a modulation frequency of between 4 and 10 Hz. In contrast, the modulation frequency (or articulation rate) of singing may be substantially lower than that of normal voice, for example, below 4 Hz or below 2 Hz. By determining the modulation frequency of speech in the first signal $S_{BC}$, a determination of whether the speech is normal speech or singing speech may therefore be made. In some embodiments, the processor 108 may be configured to monitor the modulation rate of speech of the user by monitoring one or more of the first signal $S_{BC}$ and the air conducted signal SAC from the external microphone 106 and may extract an average articulation rate or modulation rate of normal speech, singing speech and/or general speech over time. In doing so, the modulation rate used to determine whether the speech in the first signal $S_{BC}$ is singing speech or normal speech may be bespoke to the user of the headphone 100.

In some embodiments, the singing detect module 302 may determine one or more harmonic coefficients of the first signal $S_{BC}$. Singing tends to cause the human voice to strain and in doing so more harmonics are present in singing speech than in normal speech. As such, by determining the quantity and frequency of harmonics in the first signal $S_{BC}$, a determination can be made regarding whether or not the first signal $S_{BC}$ comprises singing speech or normal speech.

The singing detect module 302 may use one or more of the above metrics to determine whether or not the user of the headphone 100 is singing or not. The determination may be binary or non-binary (e.g. a likelihood of singing, not singing, or both). The singing detect module 302 may then output a result of $D_S$ based on the analysis of the first and second signals $S_{BC}$, $S_{PB}$.

In some embodiments, a gaussian mixture model (GMM) may be fitted to two or more of the metrics, such as those shown in FIG. 4.

Figure 5:
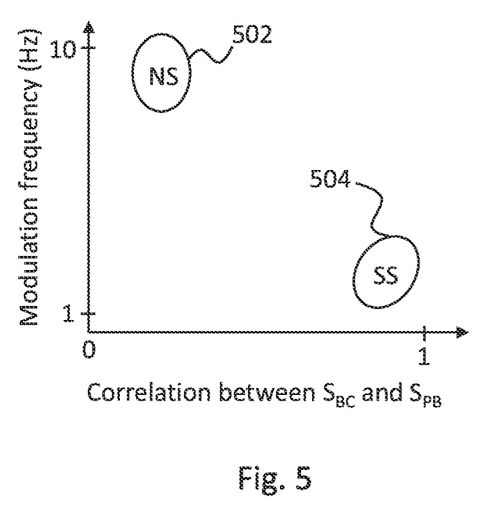
FIG. 5 is a graphical illustration of a pair of Gaussian mixture models for two of the metrics shown in FIG. 4.

FIG. 5 shows an example of such embodiments in which a GMM 502, 504 is fitted to each of the correlation between the first and second signals $S_{BC}$, $S_{PB}$ and the modulation frequency of the first signal $S_{BC}$. These GMMs may then be used to make a determination as to whether or not the first signal $S_{BC}$ comprises singing speech or normal speech, and thus whether or not the user of the headphone 100 is singing or not.

In some embodiments, to improve the robustness of the output DS of the singing detect module 302, the singing detect module 302 may determine a likelihood of singing of the user in addition to a likelihood that the user of the headphone 100 is not singing.

Figure 6:
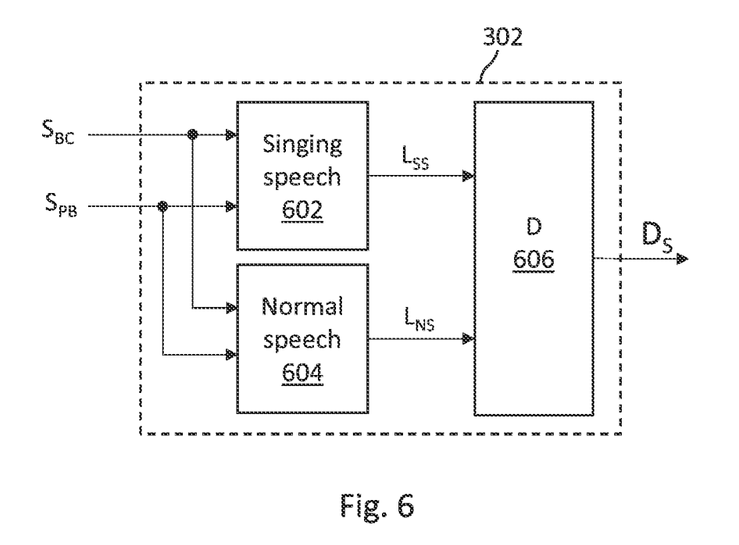
FIG. 6 is a block diagram of the singing detect module shown in FIG. 3.

FIG. 6 is a block diagram of the singing detect module 302 according to an embodiment of the disclosure. The singing detect module 302 comprises a singing speech detector 602, a normal speech detector 604 and a decision module 606. Each of the singing speech detector 602 and the normal speech detector 604 are configured to receive the first and second signals $S_{BC}$, $S_{PB}$. Based on the received first and second signals $S_{BC}$, $S_{PB}$, the singing speech detector 602 is configured to output a likelihood score $L_{SS}$ that the user is singing, i.e. that the speech present in the first signal $S_{BC}$ is singing speech. The normal speech detector 604 is configured, based on the received first and second signal $S_{BC}$, $S_{PB}$, to output a likelihood score $L_{NS}$ that the user is not singing, i.e. that the speech present in the first signal $S_{BC}$ is normal (non-singing) speech. Each of the singing speech detector 602 and the normal speech detector 604 may determine a respective likelihood score based on one or more of the metrics described above with reference to FIG. 4.

The likelihood scores $L_{SS}$, $L_{NS}$ may each comprise a probability that the user is singing or not singing respectively. The likelihood $L_{SS}$ of singing speech being present in the first signal $S_{BC}$ may be formally defined as:

$$L_{SS} = \mathcal{L}(SS|\text{data})$$

The likelihood $L_{NS}$ of normal speech being present in the first signal $S_{BC}$ may be formally defined as:

$$L_{NS} = \mathcal{L}(NS|\text{data})$$

The decision module 506 receives the likelihood scores $L_{SS}$, $L_{NS}$ from the singing speech detector 502 and the normal speech detector 504 and outputs one or more indications $D_S$ as to whether the speech present in the first signal $S_{BC}$ is singing speech or normal speech. The one or more indications may comprise a hard decision corresponding to the likelihood of singing speech being greater than the likelihood normal speech, e.g.:

$$L_{SS} > L_{NS}$$

Additionally or alternatively, the one or more indications may comprise a relative score, such as a log likelihood ratio (LLR). The LLR may be defined as follows.

$$LLR = \sum \log \frac{\mathcal{L}(SS|\text{data})}{\mathcal{L}(NS|\text{data})}$$

Additionally or alternatively, the one or more indications $D_S$ may comprise the likelihoods $L_{SS}$, $L_{NS}$ determined by the singing speech detector 502 and the normal speech detector 504 respectively. In each case, the one or more indications $D_S$ output by the decision module 506 may be probabilities of the speech being singing speech and/or the speech being normal speech.

In some embodiments, the likelihood from a plurality of indicators, such as the articulation rate, pitch period, envelope correlation etc., may be summed to determine the likelihood.

In some embodiments, the decision module 506 may provide the likelihoods $L_{SS}$, $L_{NS}$ to a neural network trained with data associated with singing speech and normal speech. Additionally or alternatively, the decision module 506 may provide the likelihoods $L_{SS}$, $L_{NS}$ to a separate module (not shown) remote from the headphone 100 for further processing. For example, the decision module 506 may pass the one or more indications $D_S$ to a host device (not shown) to which the headphone 100 is coupled. This may be advantageous where such further processing is more intensive and thus requires more computing power than is available locally.

Upon determination that the user is speaking, the processor 108 may be configured to adapt the functionality of the headphone 100 or a host device (not shown) coupled to the headphone 100. Adaptation may equally take place when it is determined that the user is speaking normally. In another example, the processor 108 may be configured to adapt the functionality of the headphone 100 or a host device on detection of a transition between singing speech and normal speech, or vice versa.

In some embodiments, the processor 108 may be configured to adapt active noise cancellation (ANC) implemented in the headphone 100 or a host device. For example, the processor 108 may be configured to turn feedforward ANC off when it is determined that the user is singing. With feedforward ANC switch on, the acoustically conducted component of the user's voice will be cancelled by the headphone 100, which may adversely affect the user's experience when singing. As such, if it is determined that the user is singing, feedforward ANC may be disabled or attenuated to reduce the potential adverse effect. In another example, feedback ANC may be switched on when it is determined that the user is singing. By switching on feedback ANC during singing, the resonance experienced by the user whilst singing with one or more occluded ears can be suppressed. In some embodiments, the feedback ANC is switched on or amplified at low frequencies only, for example below 100 Hz or below 50 Hz.

In some embodiments, the processor 108 may be configured to adapt a passthrough mode implemented by the headphone 100 or a host device (not shown) to which the headphone 100 is coupled. For example, when it is determined that the user is singing, the processor 108 may disable passthrough so that the user's singing voice is not injected through the speaker 102 back into the user's ear. Similarly, the processor 108 may be configured to attenuate any hearing augmentation implemented by the headphone 100 when it is determined that the user is singing. Hearing augmentation is known the in the art and will not be described in more detail here.

In some embodiments, on determination that the user is singing, the processor 108 may be configured to disable a voice assistant implemented by the headphone 100 or a host device coupled to the headphone 108. Well known voice assistants typically respond to a wake or trigger word such as "Hey Siri" or "Alexa". Singing by the user may in some situations accidentally trigger the voice assistant, if enabled. Such false triggering of the voice assistant may be particularly annoying to the user of the headphone 100 whilst that user is singing along to music. This is because triggering of the voice assistant may cause the music to be interrupted by the voice assistant. As such, it may be advantageous to disable any voice assistants during periods in which the user is singing.

Figure 7:
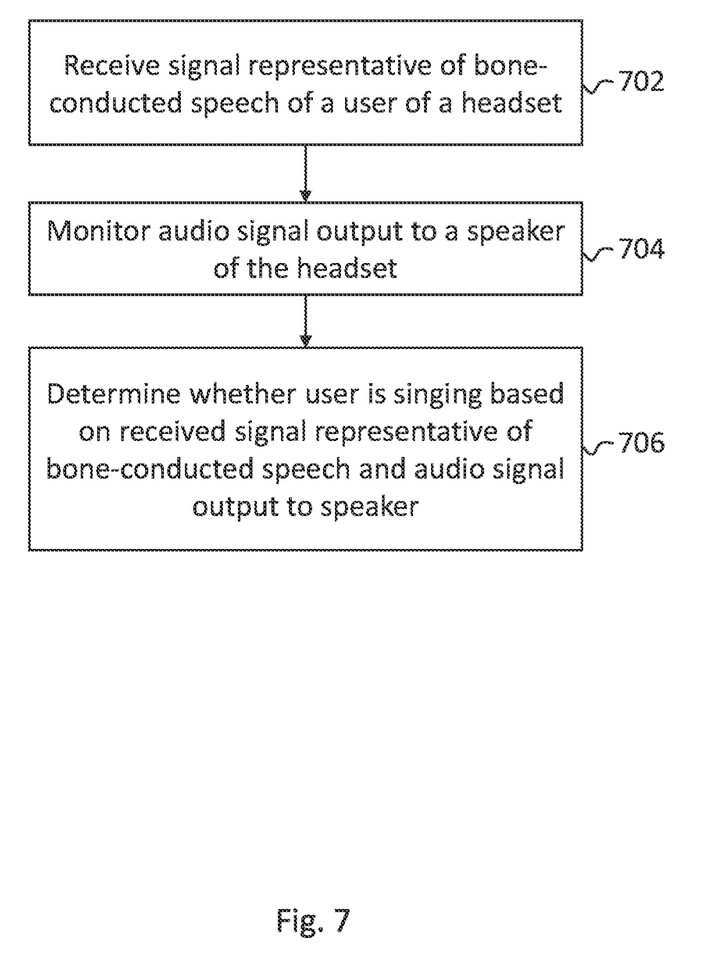
FIG. 7 is a flow diagram illustrating a process according to embodiments of the disclosure.

FIG. 7 is a block diagram of a method which may be implemented by the processor 108 described above.

At step 702, the processor 108 may receive a first signal $S_{BC}$ representative of bone-conducted speech of a user of the headphone 100. The processor may receive this signal $S_{BC}$ from the microphone 104 or from the accelerometer 114 which may itself be mechanically couple to the head of the user.

At step 704, the processor 108 may receive or monitor a second signal $S_{PB}$ which may comprise playback audio being provided to the speaker 102 for playback of audio into the user's ear.

At step 706, the processor 108 may make a determination as to whether the user of the headphone 100 is singing or not based on the received first signal $S_{BC}$ and the monitored or received second signal $S_{PB}$. Such a determination may be made in any conceivable manner, such as those described above with reference to FIGS. 3 to 6.

The processor 108 may then output an indication $D_S$ that the user is singing or not singing or a likelihood (e.g. a probability) that the user is singing. Additionally or alternatively, the processor 108 may act upon a determination the user is singing or is likely singing by taking action to adapt one or more functions of the headphone 100 or a host device to which the headphone 100 is coupled, as described above.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a wearable device (e.g. headphone, earphone, glasses (augmented reality (AR) or virtual reality (VR) glasses)), a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method of detecting singing of a user of a headset, the method comprising:
receiving a first audio signal comprising bone-conducted speech of the user from a first transducer of the headset;
monitoring a second audio signal output to a speaker of the headset; and
determining whether the user is singing based on the first audio signal and the second audio signal; and
on determining that the user is singing, disabling a pass-through mode of the headset in which a third audio signal derived from a second transducer located at an external surface of the headset is applied to the speaker of the headset.

2. The method of claim 1, further comprising:
adapting an operation of the headset or a host device coupled to the headset on detecting that the user is singing.

3. The method of claim 2, wherein the operation comprises active noise cancellation (ANC).

4. The method of claim 3, wherein adapting the operation comprises one or more of:
adapting feedforward ANC; and
adapting feedback ANC.

5. The method of claim 4, wherein adapting feedforward ANC comprises turning feedforward ANC off or modifying a frequency range of operation of feedforward ANC.

6. The method of claim 4, wherein adapting feedback ANC comprises turning feedback ANC on or modifying a frequency range of operation of feedback ANC.

7. The method of claim 2, wherein the operation comprises hearing augmentation.

8. The method of claim 2, wherein the adapting the operation comprise disabling or enabling a voice assistant.

9. The method of claim 1, wherein determining whether the user is singing comprises:
determining a likelihood that the user is singing.

10. The method of claim 9, wherein determining whether the user is not singing further comprises:
determining a likelihood that the user is singing.

11. The method of claim 9, wherein determining whether the user is singing further comprises:
determining a likelihood that the user is not singing; and
determining whether the user is singing based on the likelihood that the user is singing and the likelihood that the user is not singing.

12. The method of claim 11, wherein determining whether the user is singing comprises providing the likelihood that the user is singing and the likelihood that the user is not singing to a neural network.

13. The method of claim 1, wherein detecting that the user is singing comprises:
determining a speech articulation rate of speech in the first audio signal; and
comparing the speech articulation rate with an expected articulation rate of the user.

14. The method of claim 1, wherein detecting that the user is singing comprises:
determining a peak modulation frequency of the first audio signal.

15. The method of claim 1, wherein detecting that the user is singing comprises:
determining a correlation between the first audio signal and the second audio signal.

16. The method of claim 15, wherein determining the correlation comprises determining a correlation between an articulation rate of speech in the first audio signal and an articulation rate of speech in the second audio signal.

17. The method of claim 15, wherein determining the correlation comprises determining a correlation one or more of:
- energy of the first and second audio signals;
- modulation frequency of the first and second audio signals;
- harmonic content of the first and second audio signals.

18. The method of claim 1, wherein the first transducer is a microphone.

19. The method of claim 1, wherein the first transducer is an inertial measurement unit.

20. A non-transitory storage medium having instructions thereon which, when executed by a processor, cause the processor to perform the method of claim 1.

21. An apparatus for detecting singing by a user of a headset, the apparatus comprising:
- an input for receiving a first audio signal comprising bone-conducted speech of the user from a first transducer of the headset;
- one or more processors configured to:
  - monitor a second audio signal output to a speaker of the headset;
  - determine whether the user is singing based on the first audio signal and the second audio signal; and
  - on determining that the user is singing, disable a passthrough mode of the headset in which a third audio signal derived from a second transducer located at an external surface of the headset is applied to the speaker of the headset.

22. An electronic device comprising:

the apparatus of claim 21;

the first transducer; and the speaker.

23. The electronic device of claim 22, wherein the first transducer is an inertial measurement unit.

* * * * *

UNITED STATES PATENT AND TRADEMARK OFFICE
CERTIFICATE OF CORRECTION

PATENT NO. : 11,410,678 B2
APPLICATION NO. : 17/149285
DATED : August 9, 2022
INVENTOR(S) : Lesso et al.

It is certified that error appears in the above-identified patent and that said Letters Patent is hereby corrected as shown below:

In the Specification

In Column 5, Line 13, delete "100 further may further" and insert -- 100 may further --, therefor.

In Column 5, Line 59, delete "one of more" and insert -- one or more --, therefor.

In Column 5, Line 65, delete "transceiver 114" and insert -- transceiver 112. --, therefor.

In Column 7, Line 11, delete "through the through the speaker" and insert -- through the speaker --, therefor.

In Column 7, Line 32, delete "rate used" and insert -- rate is used --, therefor.

In Column 8, Line 22, delete "$L_{SS}= £(SS|data)$" and insert -- $L_{SS}=\mathcal{L}(SS|data)$ --, therefor.

In Column 8, Line 26, delete "$L_{NS}=£(NS|data)$" and insert -- $L_{NS}=\mathcal{L}(NS|data)$ --, therefor.

In Column 8, Line 27, delete "decision module 506" and insert -- decision module 606 --, therefor at each occurrence throughout the specification.

In Column 8, Line 28, delete "singing speech detector 502" and insert -- singing speech detector 602 --, therefor.

In Column 8, Line 29, delete "normal speech detector 504" and insert -- normal speech detector 604 --, therefor.

In Column 8, Lines 48-49, delete "singing speech detector 502 and the normal speech detector 504" and insert -- singing speech detector 602 and the normal speech detector 604 --, therefor.

In Column 9, Line 60, delete "couple to" and insert -- coupled to --, therefor.

Signed and Sealed this
Sixteenth Day of May, 2023

Katherine Kelly Vidal
*Director of the United States Patent and Trademark Office*

In the Claims

In Column 13, Line 2, in Claim 17, delete "correlation one" and insert -- correlation of one --, therefor.